(12) United States Patent
Watanabe

(10) Patent No.: US 8,875,651 B2
(45) Date of Patent: Nov. 4, 2014

(54) CONVEYANCE DEVICE FOR BASE MATERIAL HAVING BOTH SURFACES COATED WITH COATING SOLUTION

(75) Inventor: Atsushi Watanabe, Shizuoka (JP)

(73) Assignee: Toray Engineering Co., Ltd., Tokyo (JP)

( * ) Notice: Subject to any disclaimer, the term of this patent is extended or adjusted under 35 U.S.C. 154(b) by 40 days.

(21) Appl. No.: 13/381,322

(22) PCT Filed: Jun. 25, 2010

(86) PCT No.: PCT/JP2010/004226
§ 371 (c)(1),
(2), (4) Date: Dec. 28, 2011

(87) PCT Pub. No.: WO2011/001648
PCT Pub. Date: Jan. 6, 2011

(65) Prior Publication Data
US 2012/0103252 A1 May 3, 2012

(30) Foreign Application Priority Data
Jun. 30, 2009 (JP) .................................. 2009-155336

(51) Int. Cl.
*B05C 3/12* (2006.01)
*B05C 13/02* (2006.01)
(Continued)

(52) U.S. Cl.
CPC ............... *H01M 4/0404* (2013.01); *B05C 9/04* (2013.01); *B65H 23/022* (2013.01); *B65H*
(Continued)

(58) Field of Classification Search
CPC ................................ B05C 5/0254; B05C 9/04
USPC ......... 118/419, 420, 313–316, 58–60, 66–68; 427/549
See application file for complete search history.

(56) References Cited

U.S. PATENT DOCUMENTS

| 5,704,978 A * | 1/1998 | Maniwa et al. ............... 118/410 |
| 6,174,372 B1 * | 1/2001 | Yoshinaga et al. ............ 118/695 |
| 2011/0200747 A1 * | 8/2011 | Kida et al. .................... 427/209 |

FOREIGN PATENT DOCUMENTS

| JP | 10-279148 A | 10/1998 |
| JP | 2003-071360 A | 3/2003 |

(Continued)

OTHER PUBLICATIONS

International Search Report of corresponding International Application No. PCT/JP2010/004226, dated on Sep. 7, 2010.

*Primary Examiner* — Yewebdar Tadesse
(74) *Attorney, Agent, or Firm* — Global IP Counselors, LLP

(57) ABSTRACT

A double-sided coated substrate transport device (1) is described. A die head for front face coating (3) and a die head for back face coating (4) coat a coating liquid onto a substrate 1. A drying oven (5) dries the coating liquid applied to the substrate (1), to form coating films on the front and back faces of the substrate (1). A first and second rotating body unit (20A, 20B) are respectively furnished independently at widthwise edge sections of the substrate (1). Each of the first and second rotating body units has a free roller (21) and a drive roller (22) constituting a pair of rotating bodies, and a rotating body swivel section (23). The free roller (21) and the drive roller (22) grip the widthwise edge sections of the substrate (1) from the front and back sides. The rotating body swivel section (23) allows the orientation of the free roller (21) and the drive roller (22), respectively, to be modified separately for the first rotating body unit (20A) and the second rotating body unit (20B), so that the rotation axis of the free roller (21) and the drive roller (22) is inclined towards the downstream side in the substrate transport direction as seen from the outside in the substrate widthwise direction, with respect to a line perpendicular to the substrate transport direction.

6 Claims, 9 Drawing Sheets

(51) Int. Cl.

| | | |
|---|---|---|
| *H01M 4/04* | (2006.01) | |
| *B05C 9/04* | (2006.01) | |
| *B65H 23/022* | (2006.01) | |
| *B65H 23/032* | (2006.01) | |
| *B65H 23/038* | (2006.01) | |
| *H01M 4/88* | (2006.01) | |
| *B05C 5/02* | (2006.01) | |

(52) U.S. Cl.
CPC .. 23/0324 (2013.01); *B65H 23/038* (2013.01); *H01M 4/8828* (2013.01); *B05C 5/0254* (2013.01); *B05D 2252/02* (2013.01); *B05D 2252/10* (2013.01); *Y02E 60/50* (2013.01)
USPC ............... 118/420; 118/419; 118/65; 118/67; 118/316

(56) References Cited

FOREIGN PATENT DOCUMENTS

| JP | 2004-262556 A | 9/2004 |
|---|---|---|
| JP | 2007-29789 A | 2/2007 |
| JP | 2008-284528 A | 11/2008 |

\* cited by examiner

CONVEYANCE DEVICE FOR BASE MATERIAL HAVING BOTH SURFACES COATED WITH COATING SOLUTION

TECHNOLOGICAL FIELD

The present invention relates to a transport device for a double-sided coated substrate which is coated on both the front and back faces with a coating liquid, and which is employed as an electrode in a secondary cell, fuel cell, or the like.

BACKGROUND TECHNOLOGY

It is typical for double-sided coated substrates to be employed as electrodes in secondary cells, fuel cells, or the like. In double-sided coated substrates, the front and back faces of a substrate constituting a core are coated with a coating liquid containing an active substance, to form coated faces.

The normal procedure for manufacturing a double-sided coated substrate has an initial step for coating of the front face of the substrate core with a die head for front face coating and a step for approximately simultaneous coating of the back face with a die head for back face coating, followed by a step for transporting the double-sided coated substrate to a drying oven and drying the two coated faces, and a step of reeling off the double-sided coated substrate.

With regard to transporting the double-sided coated substrate, because the coated faces remain wet until approximately simultaneous coating of the faces is completed and the material reaches the drying oven, support as a continuous roll or the like is not possible. Further, in the drying oven, the coated substrate is supported by jetting a gas thereon from gas jets furnished in the upper and lower sections inside the drying oven, as disclosed in Patent Citation 1, for example.

Because of this, during transport of the double-sided coated substrate, the die head for back face coating and a backup roller are the only stable supporting members during coating of the point of coating up to the drying procedure in the drying oven, the coated substrate is unstable during transport, making the substrate prone to flapping or wrinkling during transport.

Accordingly, in co-pending Japanese Laid-open Patent Application 2005-213037 (Patent Citation 2), the present applicant proposed to dispose pairs of rotating bodies respectively at both edge sections of uncoated portions in the widthwise direction of the double-sided coated substrate, to support the substrate by nipping it from the front and back sides. With respect to the direction of transport, the orientation of the pairs of rotating bodies disposed at both edges is then readjusted simultaneously with interlocking operation of a link mechanism to tension the substrate outwardly in the widthwise direction, thereby preventing flapping, and smoothing out wrinkles.

PRIOR ART CITATIONS

Patent Citations

Patent Citation 1: Japanese Laid-open Patent Application 2001-329079

Patent Citation 2: Japanese Laid-open Patent Application 2007-29789

DISCLOSURE OF THE INVENTION

Problems to be Solved by the Invention

In production of double-sided coated substrates, the weight of the substrate and of the coating liquid coated thereon varies every time depending on production conditions, and therefore the severity of flapping of the substrate varies every time as well. Also, flapping occurring respectively at the left and right sides in the widthwise direction of the substrate may differ in severity. With regard to these phenomena, as disclosed in Patent Citation 2, differing complex modes of flapping and wrinkling at the left and right sides in the widthwise direction of a substrate cannot be resolved through a configuration which relies upon associated readjustment of the action of pairs of rotating bodies disposed at both edges of the substrate to support the substrate, so defective substrates will pose a problem.

Further, as mentioned previously, because the double-sided coated substrate is supported by the coating die heads and by gas jets from gas jet nozzles inside the drying oven during transport, during this interval the substrate assumes a state of a catenary line in the substrate transport direction and in the substrate widthwise direction. The effects of the weight of the substrate and of the coating liquid give rise to uneven contact pressure with the substrate at the widthwise left and right edges of the substrate in the liquid-ejecting sections of the coating die heads, producing a phenomenon whereby the coating liquid does not readily penetrate into portions of high contact pressure, creating a concurrent problem of irregularities in coating thickness.

Solving such problems has yet to be accomplished even where the configuration for supporting a substrate disclosed in the aforementioned Patent Citation 2 is adopted as means for solving the problems.

It is an object of the present invention to provide a transport device for a double-sided coated substrate, adapted to reduce the phenomenon of differing complex modes of flapping and the occurrence of wrinkling at the left and right sides in the widthwise direction of a substrate during transport of a double-sided coated substrate, and thereby to make irregularities in coating thickness less likely to arise in the liquid-ejecting sections of the coating die heads.

Means Used to Solve the Above-Mentioned Problems

A plurality of modes are described below as means for solving the problems. These modes may adopted in any possible combination as needed.

The transport device for a double-sided coated substrate according to a first aspect of the present invention comprises a die head for front face coating and a die head for back face coating, a drying oven, and a first rotating body unit and a second rotating body unit. The die head for front face coating and the die head for rear face coating are devices for coating a coating liquid onto front and back faces of a substrate. The drying oven is a device for drying the coating liquid applied to the substrate, to form a coating film on the front and back faces of the substrate. The first rotating body unit and the second rotating body unit are devices respectively furnished at widthwise edge sections of the substrate, to the downstream side or upstream side in the direction of transport from the die head for back face coating. Each of the first rotating body unit and the second rotating body unit has a pair of rotating bodies, and a rotating body swivel section. The pair of rotating bodies grip the widthwise edge sections of the substrate from the front and back sides. The rotating body swivel section enables the orientation of the pair of rotating bodies to be modified separately for the first rotating body unit and the second rotating body unit, respectively, so that the rotation axis of the pair of rotating bodies is inclined towards the downstream side in the substrate transport direction as seen from the outside in the substrate widthwise direction with respect to a line perpendicular to the substrate transport direction.

With this device, during transport of the double-sided coated substrate, by separately modifying the respective operations of the rotating body units which are respectively furnished independently for gripping the substrate from the front and back faces at the edge portion of the substrate, the phenomenon of flapping and the occurrence of wrinkling of the substrate arising during transport of the substrate can be reliably reduced, and concomitant irregularities in coating thickness in sections for coating the substrate are reduced. As a result, the substrate can be transported in a stable manner, and a substrate of satisfactory quality can be obtained.

Each of the first rotating body unit and the second rotating body unit may further have a moving device for separately moving the pair of rotating bodies individually in the direction of transport of the substrate.

Each of the first rotating body unit and the second rotating body unit may further have a variable gripping force device for separately modifying the gripping force at which the substrate is gripped by the pair of rotating bodies from the front and back faces of the substrate.

In the first rotating body unit and the second rotating body unit, one of the pair of rotating bodies gripping the substrate from the front and back face of the substrate may serve as a drive wheel, and another serves as a driven wheel. In this case, each of the first rotating body unit and the second rotating body unit may further have a variable rotation speed device for separately modifying the rotation speed of the drive wheel in response to the substrate transport speed.

The rotating body swivel section can adjust the incline angle of the pair of rotating bodies within a range of from 0 to 20 degrees with respect to the substrate transport direction.

A plurality of the first rotating body units and the second rotating body units may be disposed in the substrate transport direction, and the rotation speed, incline angle, or gripping force of all of the rotating body units can be set separately.

Effect of the Invention

According to the present invention, in transporting a double-sided coated substrate, rotating body units for gripping the substrate from the front and back faces at both edges of the substrate are respectively furnished independently, and the respective operations thereof can be modified separately. Consequently, the substrate can be transported in a stable manner, and a substrate of satisfactory quality can be obtained.

PREFERRED EMBODIMENTS OF THE INVENTION (1) Transport Device for Double-Sided Coated Substrate The embodiments of the invention are described below with reference to the drawings.

Figure 1A:
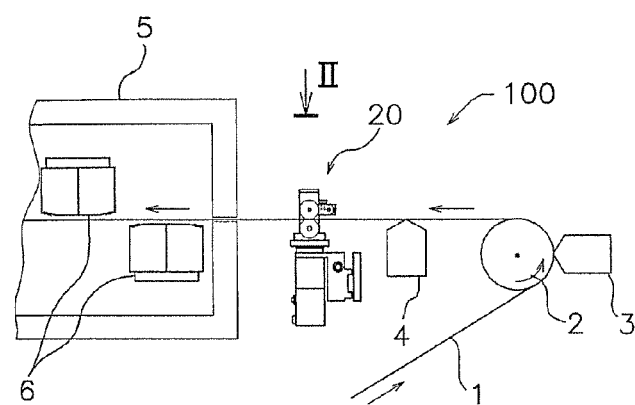
FIG. 1A is a schematic view showing the entirety of a transport device for a double-sided coated substrate according to the invention, and shows a case in which a rotating body unit is positioned between a die head for back face coating and a drying oven.

FIG. 1A is a schematic view showing the entirety of a transport device for a double-sided coated substrate according to the invention. The transport device 100 is a device for coating a coating liquid onto both faces of a substrate 1 serving as a core of an electrode for a secondary cell, fuel cell, or the like. Going from the upstream side to the downstream side in the transport direction, the transport device 100 principally has a backup roller 2, a die head for front face coating 3, a die head for back face coating 4, a rotating body unit 20, and a drying unit 5. The various rollers and motors for transporting the substrate 1 in the transport device 100 are not illustrated.

The backup roller 2 and the die head for front face coating 3 are opposed in a horizontal direction. The substrate 1 moves from diagonally downward to the opposing sections of the backup roller 2 and the die head 3, whereupon its orientation is changed by the backup roller 2 so as to subsequently move in the horizontal direction. The die head for front face coating 3 is a device for coating the front face of the substrate 1 with a coating liquid containing an active substance. The die head for back face coating 4 supports the substrate 1 from below, and is a device for coating the back face of the substrate 1 with a coating liquid containing an active substance. The drying oven 5 is a device for drying the substrate 1 coated with the coating liquid.

Inside the drying oven 5, gas jet nozzles 6 for jetting gas in order to dry the coated faces are furnished at top and bottom, and the double-sided coated substrate 1 having undergone double-sided coating is transported in a suspended state by the jetted gas.

The rotating body unit 20 is disposed between the die head for back face coating 4 and the entrance to the drying oven 5; specifically, the rotating body unit 20 has a first rotating body unit 20A and a second rotating body unit 20B disposed in uncoated sections of widthwise edge sections of the double-sided coated substrate 1. The first rotating body unit 20A and the second rotating body unit 20B respectively have pairs of rotating bodies (discussed later). The first rotating body unit 20A and the second rotating body unit 20B have left-right symmetrical comparable configurations, and therefore in the following description of the rotating body unit 20, only the first rotating body unit 20A will be described.

Figure 1B:
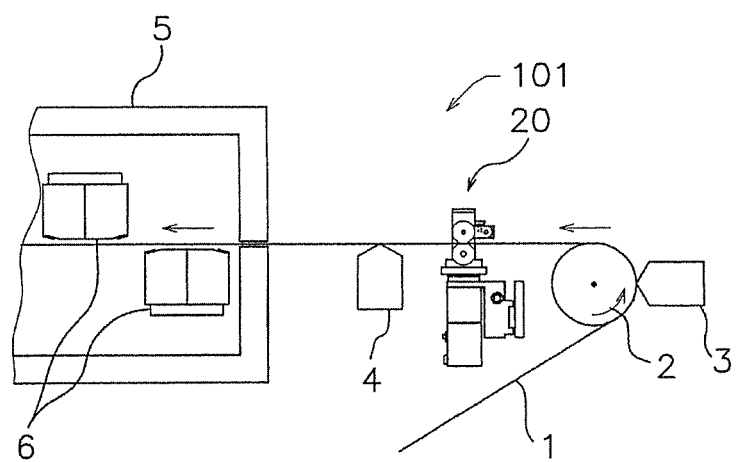
FIG. 1B is a view showing a case in which a rotating body unit is positioned between a backup roller and a die head for back face coating.

As a second embodiment, FIG. 1B shows a case in which the rotating body unit 20 is positioned between the backup roller 2 and the die head for back face coating 4 in the transport direction.

Figure 1C:
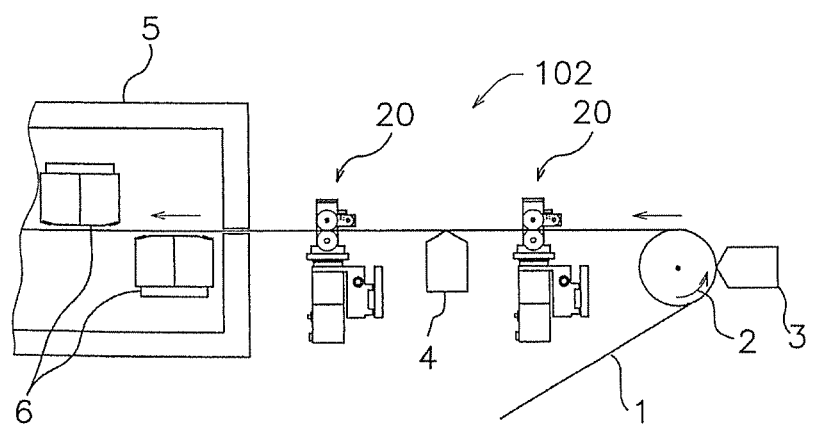
FIG. 1C is a view showing a case in which rotating body units are positioned at two locations, between a backup roller and a die head for back face coating, and between the die head for back face coating and a drying oven.

As a third embodiment, FIG. 1C shows a case in which rotating body units 20 are disposed at two locations, between the backup roller 2 and the die head for back face coating 4, and between the die head for back face coating 4 and the entrance of the drying oven 5. This embodiment is furnished with a total of four rotating body units.

(2) Rotating Body Unit

Figure 2:
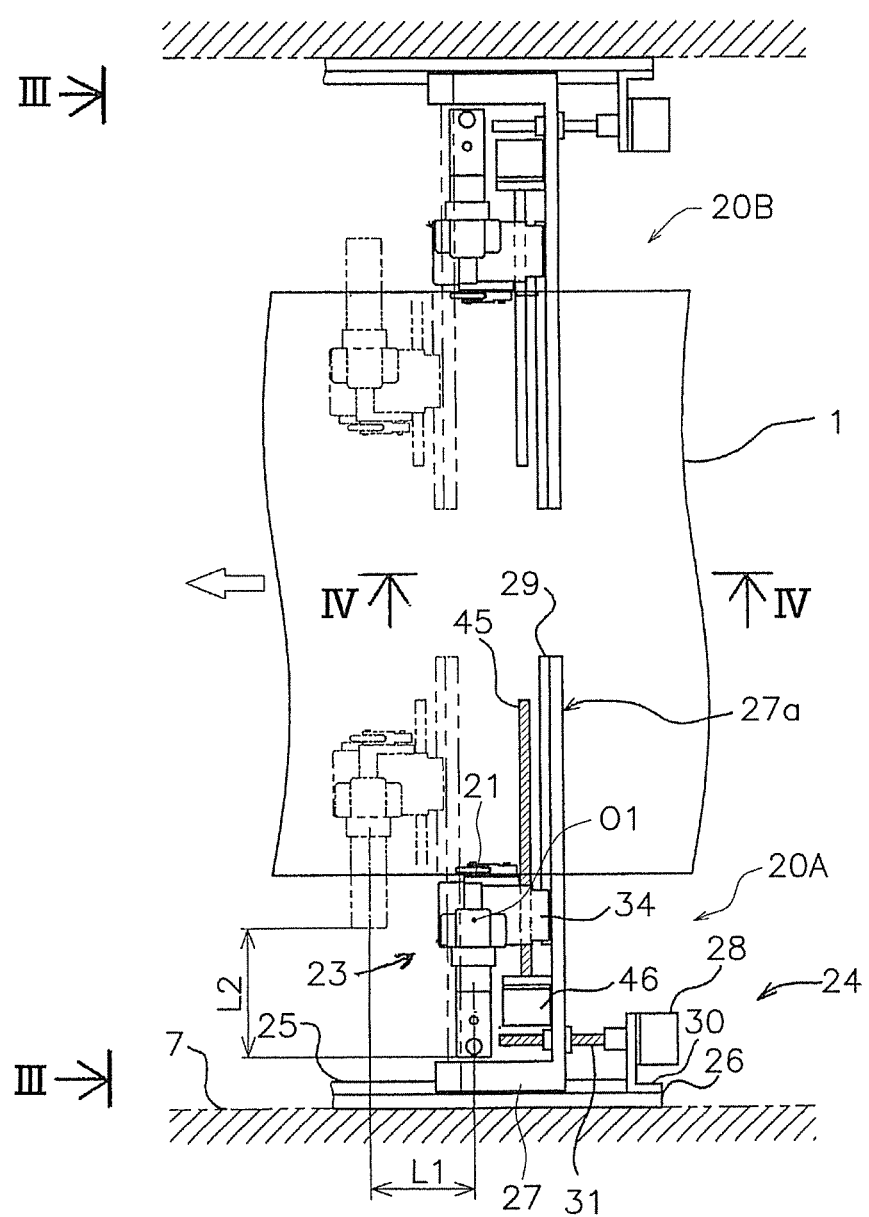
FIG. 2 is a view taken in the direction of arrow II in FIG. 1, showing disposition of the rotating body unit in plan view.
Figure 3:
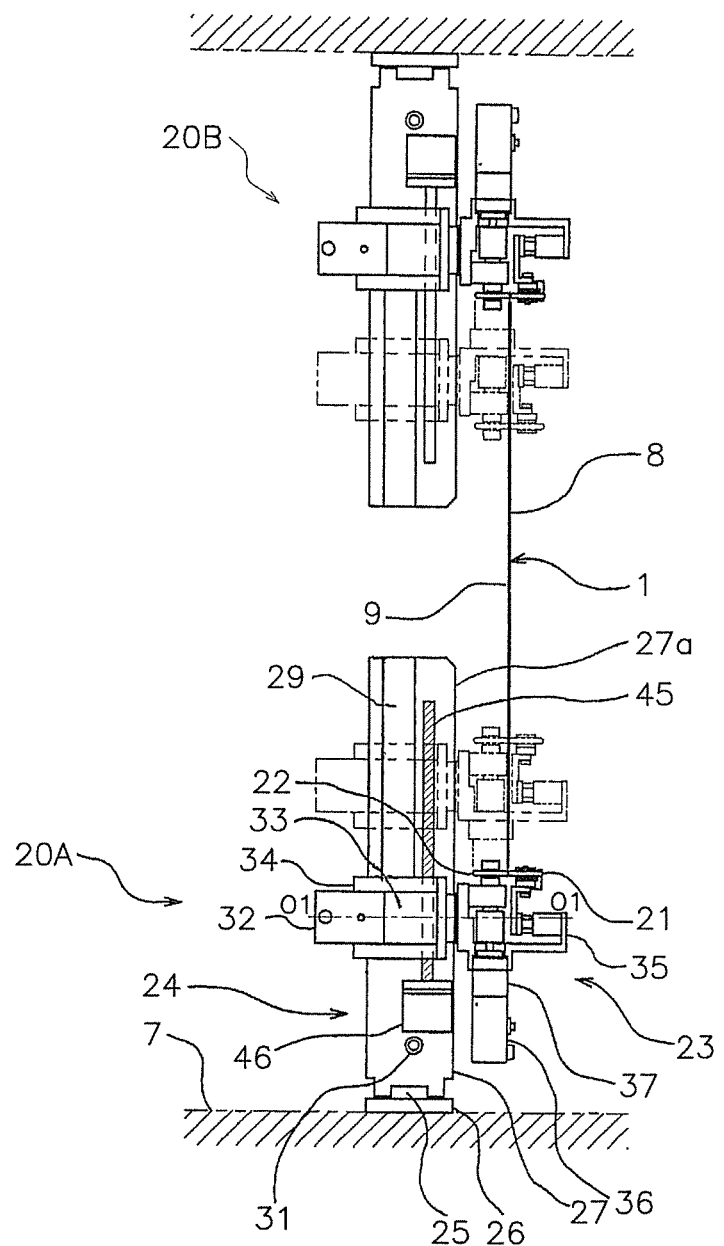
FIG. 3 is a view taken in the direction of arrow in FIG. 2, showing disposition of the rotating body unit in front view.

As shown in FIGS. 2 and 3, the first rotating body unit 20A is disposed on a frame 7 constituting the transport device 100. The first rotating body unit 20A has a pair of rotating bodies, namely, a free roller 21 and a drive roller 22; a rotating body swivel section 23; and a unit-moving section 24. The free roller 21 contacts an uncoated portion of the two edge sections of a substrate widthwise direction on a front face 8 of the substrate 1. The drive roller 22 contacts an uncoated portion of the two edge sections of a substrate widthwise direction on a back face 9 of the substrate 1. The rotating body swivel section 23 is a mechanism for causing the free roller 21 and the drive roller 22 to swivel. The unit-moving section 24 is a mechanism for moving the rotating body swivel section 23 in the substrate transport direction and in the substrate widthwise direction.

(2-1) Unit-Moving Section

The structure employed in the unit-moving section 24 to move the rotating body swivel section 23 in the substrate transport direction will now be described. The unit-moving section 24 primarily has an LM guide 25, a base 26, a bracket 27, and a unit movement-actuating servo motor 28. The base 26 is a member extending in the substrate transport direction, and secured to the frame 7. The LM guide 25 extends in the substrate transport direction, and is mounted onto the base 26. The bracket 27 engages the LM guide 25 and is moveable in the substrate transport direction. The bracket 27 further has a portion 27a extending in the widthwise direction of the substrate. The movement-actuating servo motor 28 is secured to the base 26 by a mounting fitting 30. A threaded shaft 31 is coupled with the output shaft of the motor 28, and the threaded shaft 31 meshes with a threaded hole in the bracket 27. Through the above structure, when the motor 28 rotates, the bracket 27 moves in the substrate transport direction along the LM guide 25, through rotation of the threaded shaft 31.

It is possible for this movement in the substrate transport direction to take the form of separate movements (direction L1 of FIG. 2) of the first rotating body unit 20A and the second rotating body unit 20B respectively, which are independently disposed at the edge sections in the widthwise direction of the substrate; and likewise it is possible for the respective distances of movement thereof to be adjusted freely. Because of this, even if complex flapping or wrinkling should arise in the substrate 1 during transport, the rotating body unit 20 can be set to an optimal position to minimize flapping and wrinkling.

Next, the structure employed in the unit-moving section 24 to move the rotating body swivel section 23 in the widthwise direction of the substrate (direction L2 of FIG. 2) will be described. The unit-moving section 24 further has an LM guide 29, a threaded shaft 45, and a fixed width servo motor 46. The LM guide 29 extends in the widthwise direction of the substrate, and is mounted onto the bracket 27 in the section 27a thereof extending in the widthwise direction of the substrate. The fixed width servo motor 46 is mounted onto the bracket 27. The threaded shaft 45 is coupled with the output shaft of the fixed width servo 46, with the threaded shaft 45 meshing with the bottom section of a bracket 34 (discussed below) of the rotating body swivel section 23. By virtue of the structure discussed above, when the fixed width servo 46 rotates, the bracket 34 and the rotating body swivel section 23 move in the widthwise direction of the substrate over the LM guide 29, through screw action on the part of the threaded shaft 45 and the bracket 34.

It is possible for this movement in the widthwise direction of the substrate to take the form of separate movements (direction L2 of FIG. 2) of the first rotating body unit 20A and the second rotating body unit 20B respectively, which are independently disposed at the edge sections in the widthwise direction of the substrate, and likewise it is possible for the respective distances of movement thereof to be adjusted freely. Because of this, even if complex flapping or wrinkling should arise in the substrate 1 during transport, the rotating body unit 20 can be set to an optimal position for minimizing flapping and wrinkling.

Such moving adjustments of the gripping positions of the rotating body swivel section 23, that is, the pair of rotating bodies composed of the free roller 21 and the drive roller 22, in either edge section of the substrate in the widthwise direction are indispensable for the purpose of accurately gripping uncoated portions at either edge section of the substrate, which are ordinarily approximately 10 mm in size; and the grip positions thereof can be easily adjusted through this function.

Also, by way of production conditions of electrodes for secondary cells or fuel cells, modifications are sometimes made to the width dimensions of the substrate, and such modifications of production conditions can be easily accommodated.

(2-2) Rotating Body Swivel Section

Figure 4:
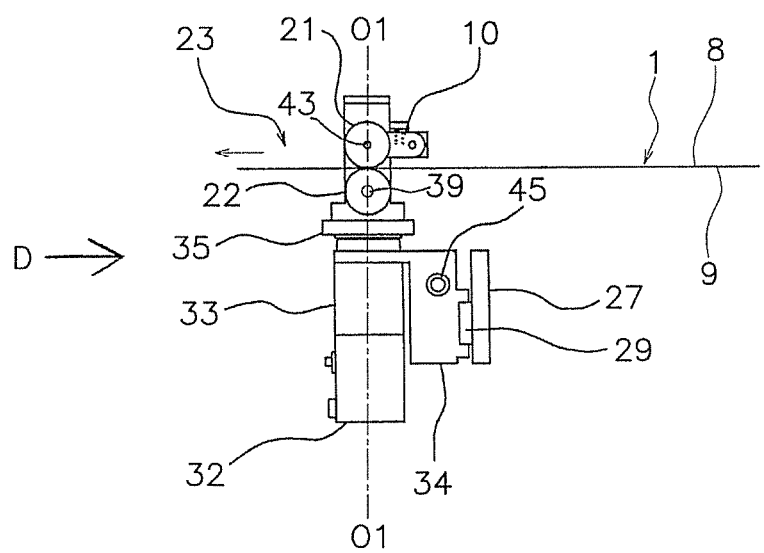
FIG. 4 is a view taken in the direction of arrow Iv-Iv in FIG. 2, showing disposition of the rotating body unit in side view.
Figure 5:
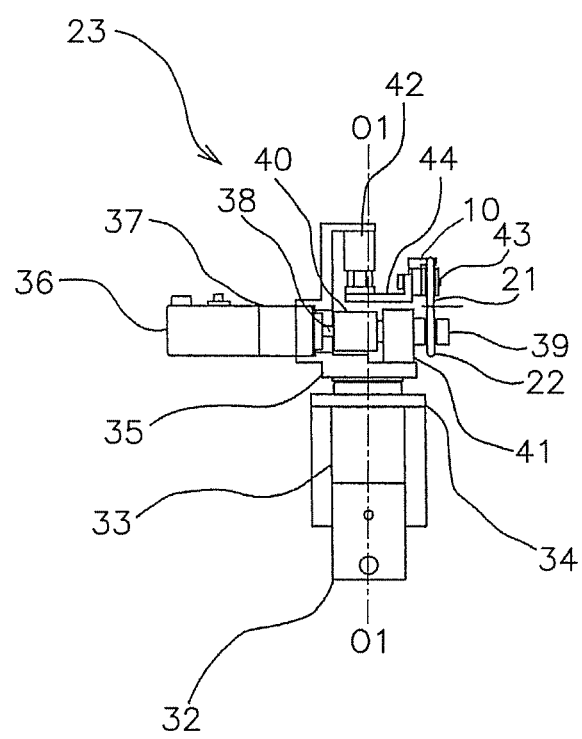
FIG. 5 is a view taken in the direction of arrow V in FIG. 4.

The rotating body swivel section 23 is shown in FIGS. 4 and 5. This rotating body swivel section 23 is a structure for swiveling, by a predetermined angle, the first rotating body unit, i.e., the free roller 21, and the second rotating body unit, i.e., the slip system drive roller 22.

The rotating body swivel section 23 has a swivel-actuating servo motor 32, a swivel-actuating reduction gear 33, an L-type bracket 34, a swiveling member 35, an air cylinder 42, a coupling plate 44, and a spring pressure link mechanism 10. The L-type bracket 34 is mounted through engagement with the LM guide 29 as discussed above, and meshes with the threaded shaft 45 as well. The swivel-actuating reduction gear 33 and the swivel-actuating servo motor 32 are mounted on the L-type bracket 34. The swiveling member 35 has its lower section 35a affixed to the output shaft (not shown) of the swivel-actuating reduction gear 33.

With the above structure, when the swivel-actuating servo motor 32 rotates, the swiveling member 35 (that is, the rotating body swivel section 23 as well) rotates. The rotating body swivel section 23 is capable of rotating about a rotation center axis O1 which extends in the vertical direction.

Next, the structure for mounting the free roller 21 and the drive roller 22 on the swiveling member 35 will be described.

The structure for mounting the free roller 21 onto the swiveling member 35 is constituted by the air cylinder 42, the coupling plate 44, and the spring pressure link mechanism 10. The air cylinder 42 is hung from an upper section 45b of the swiveling member 35. The coupling plate 44 couples the spring pressure link mechanism 10 to the swiveling member 35. The free roller 21 is capable of rotating about a rotating shaft 43, with respect to the spring pressure link mechanism 10.

The structure for mounting the drive roller 22 onto the swiveling member 35 is constituted by a rotation-actuating servo motor 36, a rotation-actuating reduction gear 37, a bearing 41, and a rotating shaft 39. The bearing 41 is mounted on the swiveling member 35, and rotatably supports the drive roller 22 about the rotating shaft 39.

The servo motor 36 and the rotation-actuating reduction gear 37 are coupled to one another, the rotation-actuating reduction gear 37 secured to the swiveling member 35. The rotating shaft 39 of the drive roller 22 is coupled by a coupling 40 to an output shaft 38 of the rotation-actuating reduction gear 37.

Owing to this configuration, via the rotation-actuating reduction gear 37, the drive roller 22 rotates by rotation of the rotation-actuating servo motor 36.

(2-3) Swivel Operation of the Rotating Bodies

Figure 6:
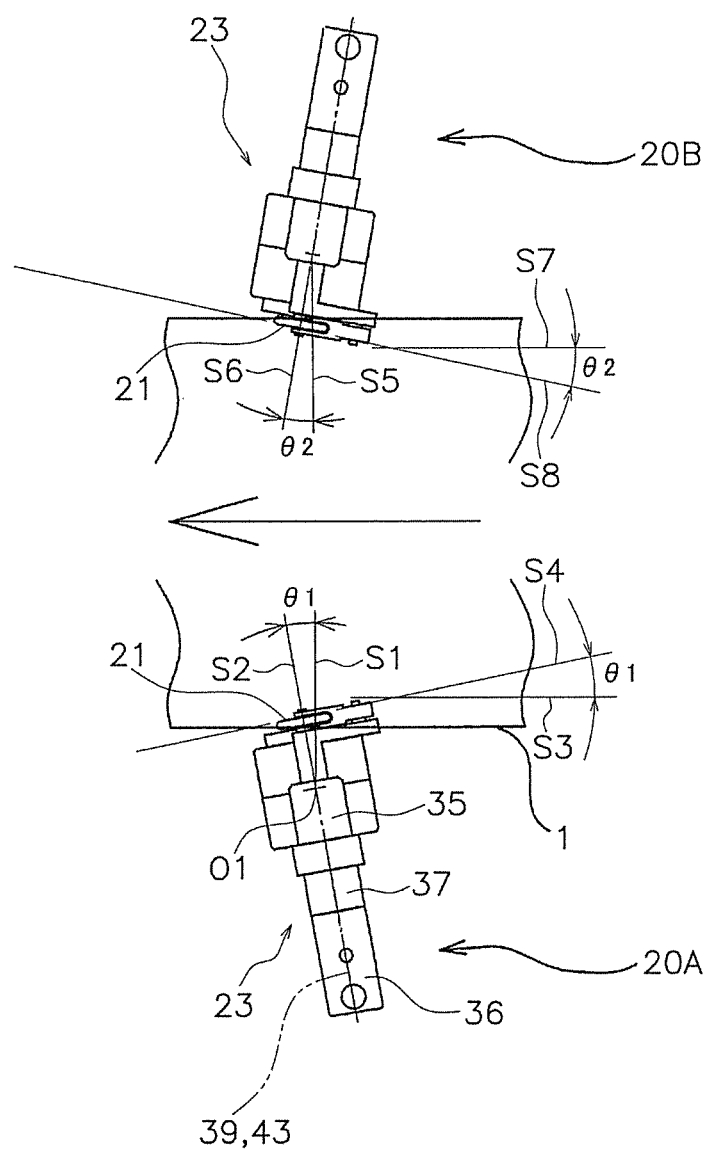
FIG. 6 is a plan view showing orientation of rotating body units with respect to the substrate transport direction.

The orientation of swivel of the free roller 21 and the drive roller 22 will be described. As shown in FIG. 6, the free roller 21 and the drive roller 22 are swivelable in a direction whereby both rotating shafts (39, 43) thereof incline towards the downstream side in the direction of transport of the substrate 1 with respect to a direction perpendicular to the substrate transport direction, as viewed from the outside in the widthwise direction of the substrate. That is, as shown in FIG. 6, each of the free roller 21/drive roller 22 pairs at either edge of the substrate oscillate in such a way that the downstream edges thereof in the direction of transport of the substrate are positioned further outwardly from the upstream edges thereof, in the widthwise direction of the substrate. The maximum oscillation angle ($\theta 1$) thereof is 20 degrees, that is, the rotating shafts (39, 43) actually can oscillate within a range of from 0 to 20 degrees. In other words, in the first rotating body unit 20A, the rotating shafts (39, 43) are pivotable between a straight line S1 perpendicular to the substrate transport direction, and a straight line S2 at a position representing pivoting by $\theta 1$ about the rotation center axis O1 with respect to the straight line S1. Represented another way, the orientation of the free roller 21 and the drive roller 22 can fluctuate between a straight line S3 parallel to the substrate transport direction and a straight line S4 inclined by $\theta 1$ with respect thereto inwardly in the widthwise direction of the substrate.

In many cases, adequate effect is obtained where the aforedescribed oscillation angle or incline angle is substantially on the order of 1 or 2 degrees. Also, with typical coating parameters, aforedescribed angles of within 5 degrees can be applied in actual operations. However, in rare cases, such as where the coating liquid being applied to the substrate is heavy, where there is minimal friction between the substrate and the pair of rotating bodies, or where it is otherwise desirable to increase outward pulling force on the substrate, sagging and wrinkling of the substrate can be prevented by setting the aforedescribed angle to 5 degrees or more and 20 degrees or less.

(2-4) Other Characteristics

With regard to rotation speed of the drive roller 22, it is possible to bring about satisfactory tensioning of the substrate by increased speed of several percent of the speed of transport of the substrate 1 (for example, for a substrate transport speed of 10 m/min, a speed increase of 1% thereof).

Thus, through individual oscillating adjustments of the free roller 21/drive roller 22 pairs at either edge section of the substrate, and through separate driving of the drive roller 22, outward tensioning can be favorably maintained throughout the entire face of the substrate being transported, making possible transport in a stable manner without flapping or wrinkling. Because of this, contact pressure with the substrate is uniform, particularly in the ejection section of the die head for back face coating, and therefore irregularities in coating thickness in ejection sections are resolved as well.

With regard to driving of the drive roller 22, if the drive roller 22 is not driven and instead experiences driven rotation, this will place a load on the substrate during transport and pose a risk of pulsations arising from deviations in substrate transport speed, but this can be minimized as well. However, in cases where the aforedescribed problem does not occur, or does occur but not severely, both of the pair of rotating bodies may be free rollers.

With regard to the free roller 21 on the other hand, gripping force on the substrate can be adjusted through up and down operation by extension and retraction of the air cylinder 42. Further, once the gripping force has been set by the air cylinder 42, due to the free roller 21 mounting method which relies on the spring force link system discussed previously, the free roller 21 can move up and down in response to the size of adhering matter and the like on the surfaces of either edge section of the substrate. It is thus possible to constantly maintain satisfactory surfaces at either edge section of the substrate.

Depending on the electrode for use in a secondary cell or fuel cell, the substrate employed for double-sided coating may be one that is very thin and weak; in such cases, because the gripped sections of the substrate may experience scratching, rupture, or the like under a constant level of gripping force, it is very effective to control the gripping force with this sort of free roller 21.

(3) Control Configuration

Operation control of the rotating body unit 20 in the transport device 100 for double-sided coated substrate of the present invention is carried out by a control panel 51 comprising various electrical instruments, gauges, and the like.

Figure 7:
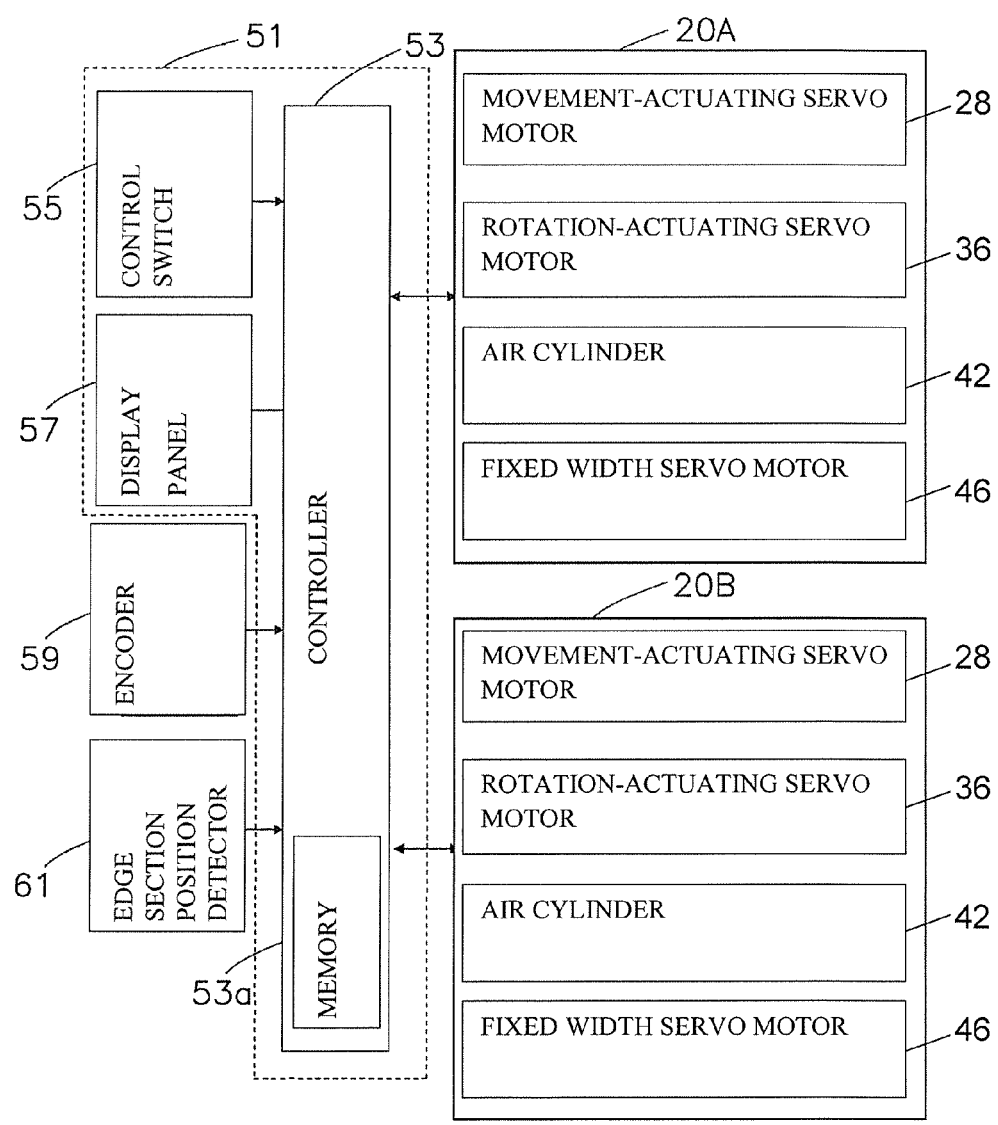
FIG. 7 is a block configuration diagram of a control panel for controlling the rotating body units.

As shown in FIG. 7, the control panel 51 is furnished with a controller 53, a control switch 55, and a display panel 57, and is adapted to control the various electrical instruments, gauges, and the like. The controller 53 is a computer having a CPU and memory, i.e., RAM and ROM. The controller 53 has a memory 53a. When an operator controls the control switch 55, a control signal is input to the controller 53. The controller 53 is capable of displaying on the display panel 57 the current state of each instrument. A detection signal is input to the controller 53 from an encoder 59 for detecting the speed of the substrate 1. A detection signal is input to the controller 53 from an edge section position detector 61. The edge section position detector 61 is a laser displacement gauge or sensor that can measure the positions of the respective widthwise end sections of the substrate 1, at a location to the upstream side or downstream side in proximity to the rotating body unit 20.

The controller 53 is respectively connected with the first rotating body unit 20A and the second rotating body unit 20B, the movement-actuating servo motors 28, the rotation-actuating servo motors 36, the air cylinders 42, and the fixed width servo motors 46. The controller 53 can transmit different control signals to each of the movement-actuating servo motors 28, to each of the rotation-actuating servo motors 36, to each of the air cylinders 42, to each of the fixed width servo motors 46, to the first rotating body unit 20A, and to the second rotating body unit 20B. The first rotating body unit 20A and the second rotating body unit 20B, the movement-actuating servo motors 28, the rotation-actuating servo motors 36, the air cylinders 42, and the fixed width servo motors 46 transmit detection signals detecting their respective states to the controller 53.

In so doing, for each product class, an oscillation angle for the rotating body swivel section 23, a rotation speed for the rotation-actuating servo motors 36, a pressure for the air cylinders 42, and the like are registered as registration data in the memory 53a, so that the appropriate data can be read out and used. Therefore, data optimal to a particular product class, specifying an angle of incline for the rotating body unit 20, a rotation speed for the drive roller 22, and a gripping force for the pair of rotating bodies which clamp the substrate 1 can be read out and used appropriately, reducing the working time associated with class modification.

Also, the angle of the rotating body swivel section 23, the speed of the rotation-actuating servo motors 36, the pressure of the air cylinders 42, and the like may be modified or fine-tuned while the coating process is running. In so doing, flapping or wrinkling arising during in the substrate during transport can be promptly corrected. As a result, the occurrence of defective products can be prevented.

Control of the rotation speed of the rotation-actuating servo motors 36 may be carried out not only in cases in which rotation speed per unit time is controlled, but also through control of drive torque.

Further, the rotation speed of the drive rollers 22 of the rotating body units 20 may be about the same at left and right in the widthwise direction, or set separately to different levels.

The angle of incline of the rotating body units 20 may be symmetrical to left and right in the widthwise direction, or asymmetrical to left and right. By adjusting these running parameters while looking at the extent of flapping and wrinkling that actually occurs, the occurrence of flapping and wrinkling of a substrate can be prevented.

Also, with greater angles of oscillation of the rotating body swivel sections 23, it is preferable for the set value of rotation speed for the rotation-actuating servo motors 36 to be one that sets a speed increase of several percent. In so doing, the speed component of the drive roller 22 in the transport direction of the substrate will be equal to or greater than the actual transport speed of the substrate, and flapping and wrinkling of the substrate can be prevented.

The controller 53 may monitor a signal from the edge section position detector 61, and in cases in which the position of an edge section of the substrate 1 has diverged from a pre-specified range, may carry out automatic control to adjust the angle of incline of the rotating body units 20 and the rotation speed of the driver roller 22. In so doing, the amount by which the substrate 1 moves to either side in the widthwise direction during transport can be measured, and through adjustments to the angle of incline of the rotating body units 20 and to the rotation speed of the driver roller 22, control by automatic correction can take place to keep the degree to which the substrate 1 moves to either side within a specified value range.

(4) Characteristics

The characteristics of the aforedescribed embodiment can be represented as follows. The transport device for a double-sided coated substrate 1 comprises a die head for front face coating 3 and a die head for back face coating 4, a drying oven 5, and a first rotating body unit 20A and a second rotating body unit 20B. The die head for front face coating 3 and the die head for rear face coating 4 are devices for coating a coating liquid onto front and back faces of a substrate 1. The drying oven 5 is a device for drying the coating liquid applied to the substrate 1, to form coating films on the front and back faces of the substrate 1. The first rotating body unit 20A and the second rotating body unit 20B are devices respectively furnished independently at widthwise edge sections of the substrate 1, to the downstream side or upstream side in the direction of transport from the die head for back face coating 4. Each of the first rotating body unit 20A and the second rotating body unit 20B has a free roller 21 and a drive roller 22 constituting a pair of rotating bodies, and a rotating body swivel section 23. The free roller 21 and the drive roller 22 grip the widthwise edge sections of the substrate 1 from the front and back sides. The rotating body swivel section 23 allows the orientation of the free roller 21 and the drive roller 22, respectively, to be modified separately, so as to incline the rotation axis of the free roller 21 and the drive roller 22 towards the downstream side in the substrate transport direction as seen from the outside in the substrate widthwise direction with respect to a line perpendicular to the substrate transport direction.

With this device, during transport of the double-sided coated substrate 1, by separately modifying the respective operations of the rotating body units which are respectively furnished independently for gripping the substrate 1 from the front and back faces at the edge portion of the substrate 1, the phenomenon of flapping and the occurrence of wrinkling of the substrate 1 arising during transport of the substrate 1 can be reliably prevented, preventing concomitant irregularities in coating thickness in sections for coating the substrate 1, whereby the substrate 1 can be transported in a stable manner, and a substrate 1 of satisfactory quality can be obtained.

Each of the first rotating body unit 20A and the second rotating body unit 20B has a moving device (25, 26, 27, 28, 30, 31) for separately moving the free roller 21 and the drive roller 22 in the direction of transport of the substrate 1.

Each of the first rotating body unit 20A and the second rotating body unit 20B has an air cylinder 42 for separately varying the gripping force at which the substrate 1 is gripped by the free roller 21 and the drive roller 22 from the front face 8 and the back face 9 of the substrate 1.

In the first rotating body unit 20A and the second rotating body unit 20B, one member of the pair of rotating bodies which grip the substrate 1 from the front and back face of the substrate 1 serves as a drive wheel (drive roller 22), and the other as a driven wheel (free wheel 21). In this case, each of the first rotating body unit 20A and the second rotating body unit 20B has a rotation-actuating servo motor 36 for separately modifying the rotation speed of the drive roller 22 in response to the substrate transport speed.

The rotating body swivel section 23 can adjust the incline angle of the free roller 21 and the drive roller 22 within a range of from 0 to 20 degrees with respect to the substrate transport direction.

(5) Second to Fourth Embodiments

With regard to disposition of the rotating body units 20 in the double-sided coated substrate transport device, there are cases in which, during simultaneous coating of both sides of a substrate, there is marked swelling of the coating solution, making it necessary to impart tension in the widthwise direction of the substrate prior to coating the back face.

In such cases, according to a second embodiment, as shown in FIG. 1B, the rotating body unit 20 can also be disposed between the backup roller 2 and the die head for back face coating 4. Further, according to a third embodiment, as shown in FIG. 1C, rotating body units 20 can be disposed at two locations, between the backup roller 2 and the die head for back face coating 4, and between the die head for back face coating 4 and the entrance of the drying oven 5.

It is conceivable that, depending on double-sided coating parameters, unanticipated complex modes of flapping and wrinkling may occur in a substrate during transport. In such cases, as a matter of course, it will be necessary to increase the tensioning force in the widthwise direction of the substrate, but with a single rotating body unit 20 set disposed at each of the edge sections of the substrate, the tensioning force thereof may be insufficient to minimized complex modes of flapping and wrinkling.

According to a fourth embodiment, a plurality of first rotating body units 20A and second rotating body units 20B are disposed along the substrate transport direction, the rotation speed of the drive roller 22, or the angle of incline or gripping force of the rotating body units 20, being settable separately for all of the rotating body units 20. In so doing, the aforedescribed tensioning force can be assured, and the substrate can be transported in a satisfactory state.

Further, according to the fourth embodiment, the rotation speed of the rotation-actuating servo motors 36 may be set such that transport speed progressively increases from the portion where the backup roller 2 is positioned upstream in the substrate transport direction, to the die head for back face coating 3, and the drying furnace 5 positioned downstream. In so doing, appropriate pulling force can be brought to bear in the substrate transport direction, and flapping and wrinkling or the substrate can be prevented.

(6) Other Embodiments

While the present invention has been described in terms of certain preferred embodiments, the invention is not limited to the aforedescribed embodiments; various modifications are possible without departing from the sprit of the invention. In particular, the plurality of embodiments and modification examples set forth in the present Specification may be combined as needed.

KEY TO SYMBOLS

1: substrate
2: backup roller
3: die head for front face coating
4: die head for back face coating
5: drying oven
6: gas jet nozzle
7: frame
8: front face
9: back face
10: spring pressure link mechanism
20: rotating body unit
20A: first rotating body unit
20B: second rotating body unit
21: free roller (rotating body)
22: drive roller (rotating body)
23: rotating body swivel section
24: unit-moving section
25: LM guide (moving device)
26: base (moving device)
27: bracket (moving device)
28: movement-actuating servo motor
29: LM guide (moving device)
30: mounting fitting
31: threaded shaft
32: swivel-actuating servo motor
33: swivel-actuating reduction gear
34: bracket
35: swiveling member
36: rotation-actuating servo motor (variable rotation speed device)
37: rotation-actuating reduction gear
38: output shaft
39: rotating shaft
40: coupling
41: bearing
42: air cylinder (variable gripping force device)
43: rotating shaft
44: coupling plate
45: threaded shaft
46: fixed width servo motor
51: control panel
53: controller
53a: memory
55: control switch
57: display panel
59: encoder
61: edge section position detector
100: transport device (double-sided coated substrate transport device)
101 transport device
102 transport device

The invention claimed is:

1. A transport device for a double-sided coated substrate, comprising:
a first die head for front face coating and a second die head for back face coating, the first and second die heads configured to coat a coating liquid onto front and back faces of a substrate;
a drying oven for drying the coating liquid applied to the substrate, to form a coating film on the front and back faces of the substrate; and
a first rotating body unit configured at a first position to grip a first widthwise edge section of the substrate and a second rotating body unit at a second position to grip a second widthwise edge section of the substrate being opposite to the first widthwise edge, an imaginary line between the first and second positions being perpendicular to a transport direction of the substrate;
the first rotating body unit including
a first pair of rotating bodies for gripping the first widthwise edge section of the substrate from the front and back sides, the first pair of rotating bodies having a pair of first rotating shafts, the first rotating shafts extending parallel with respect to each other, and
a first rotating body swivel section that enables an orientation of the first pair of rotating bodies for the first rotating shafts to have a first incline angle with respect to the transport direction, the first rotating body swivel section rotatably supporting both of the first pair of rotating bodies about the first rotating shafts, respectively, the first rotating body swivel section swiveling both of the first pair of rotating bodies with the first rotating shafts about a first swivel axis while maintaining the first rotating shafts in parallel with respect to each other,
the second rotating body unit including
a second pair of rotating bodies for gripping the second widthwise edge section of the substrate from the front and back sides, the second pair of rotating bodies having a pair of second rotating shafts, the second rotating shafts extending parallel with respect to each other, and
a second rotating body swivel section that enables an orientation of the second pair of rotating bodies to for the second rotating shafts to have a second incline angle with respect to the transport direction, the second rotating body swivel section rotatably supporting both of the second pair of rotating bodies about the second rotating shafts, respectively, the second rotating body swivel section swiveling both of the second pair of rotating bodies with the second rotating shafts about a second swivel axis while maintaining the second rotating shafts in parallel with respect to each other, the orientation of the first pair of rotating bodies being independent from the orientation of the second pair of rotating bodies.

2. The transport device for a double-sided coated substrate according to claim 1, wherein each of the first rotating body unit and the second rotating body unit further has a moving device for separately moving the pair of rotating bodies individually in the direction of transport of the substrate.

3. The transport device for a double-sided coated substrate according to claim 1, wherein each of the first rotating body unit and the second rotating body unit further has a variable gripping force device for separately modifying the gripping force at which the substrate is gripped by the pair of rotating bodies from the front and back faces of the substrate.

4. The transport device for a double-sided coated substrate according to claim 1, wherein in the first rotating body unit and the second rotating body unit, one of the pair of rotating bodies gripping the substrate from the front and back face of the substrate serves as a drive wheel, while another serves as a driven wheel; and each of the first rotating body unit and the second rotating body unit further has a variable rotation speed device for separately modifying the rotation speed of the drive wheel in response to the substrate transport speed.

5. The transport device for a double-sided coated substrate according to claim 1, wherein the first and second rotating body swivel section can adjust the first and second incline angles of the pair of rotating bodies, respectively, within a range of from 0 to 20 degrees with respect to the substrate transport direction.

6. The transport device for a double-sided coated substrate according to claim 1, wherein a plurality of the first rotating body units and the second rotating body units are disposed in the substrate transport direction, and the rotation speed, first and second incline angles, or gripping force of all of the rotating body units can be set separately.

* * * * *